2 Sheets—Sheet 1.

G. W. HERRICK.

STOVE.

No. 6,723.

Reissued Nov. 2, 1875.

Attest:
Chas Thurman
R A Dyer

Inventor:
George W. Herrick
by Geo. W. Dyer
Atty

N. PETERS, PHOTO-LITHOGRAPHER, WASHINGTON, D. C.

G. W. HERRICK.

STOVE.

No. 6,723. Reissued Nov. 2, 1875.

Witness:
Chas Thurman.
R. T. Dyer.

Inventor:
George W. Herrick
by Geo. W. Dargo
Attyp.

N. PETERS, PHOTO-LITHOGRAPHER, WASHINGTON, D. C.

UNITED STATES PATENT OFFICE.

GEORGE W. HERRICK, OF DETROIT, MICHIGAN, ASSIGNOR TO THE DETROIT STOVE WORKS, OF SAME PLACE.

IMPROVEMENT IN STOVES.

Specification forming part of Letters Patent No. 163,775, dated May 25, 1875; reissue No. 6,723, dated November 2, 1875; application filed October 5, 1875.

*To all whom it may concern:*

Be it known that I, GEORGE W. HERRICK, of Detroit, in the county of Wayne and State of Michigan, have invented an Improvement in Heating-Stoves, of which the following is a specification:

The nature of my invention relates more particularly to a base-burning stove for soft or bituminous coals; and its object is to so construct the stove as to insure perfect combustion of the gases evolved from the fuel before they leave it.

The invention consists principally in the combination, with a magazine-stove, of a combustion chamber, provided with a hanging bridge wall, and the arrangement, with relation thereto, of certain passages for supplying a current of air to the gases of combustion as they enter the combustion-chamber, thereby furnishing the oxygen necessary to secure their ignition and combustion.

Figure 1:
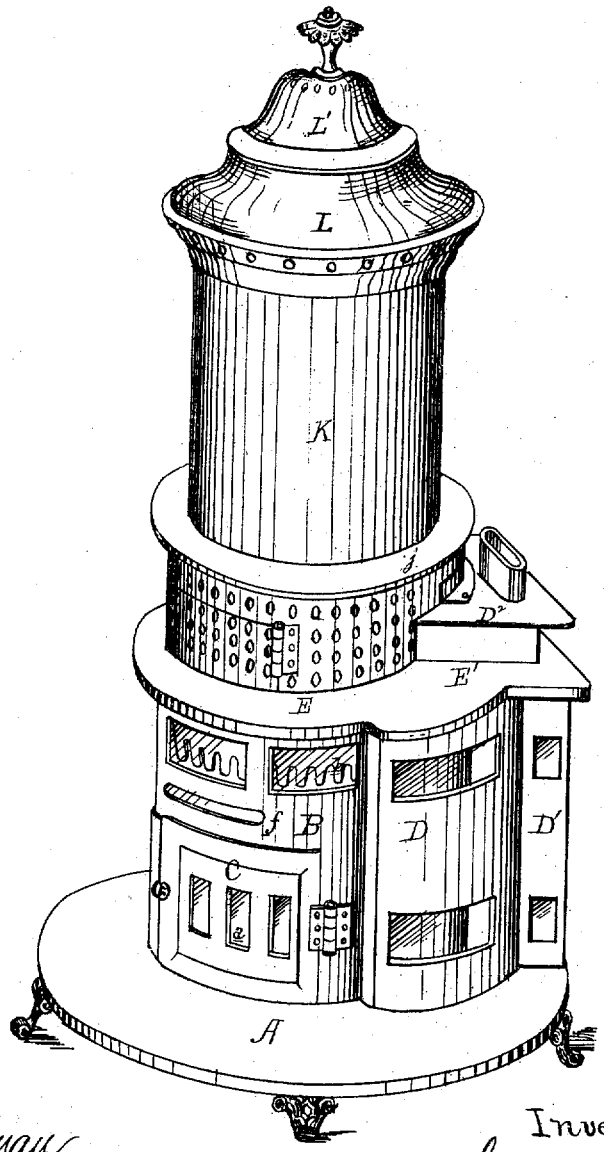
Figure 2:
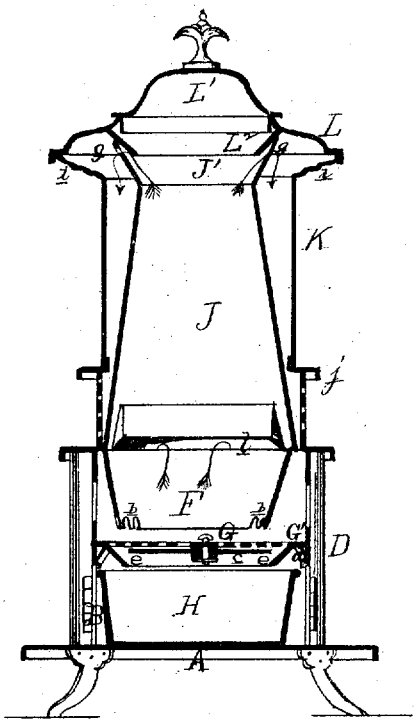
Figure 3:
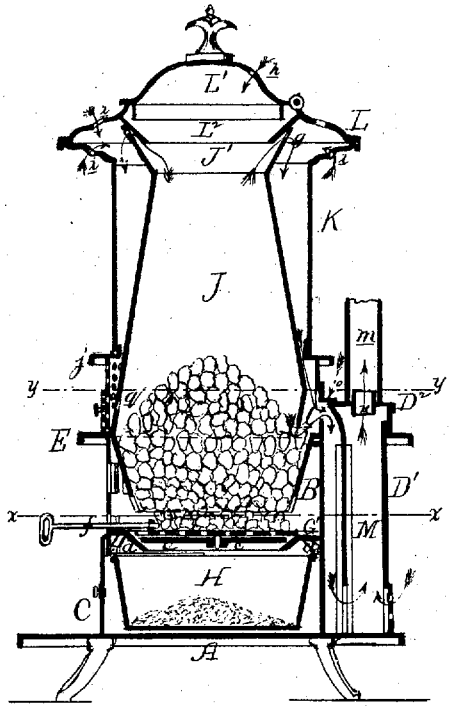
Figure 4:
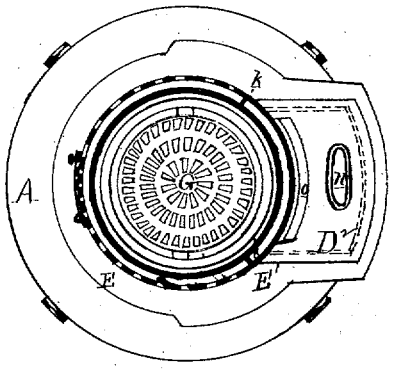
Figure 5:
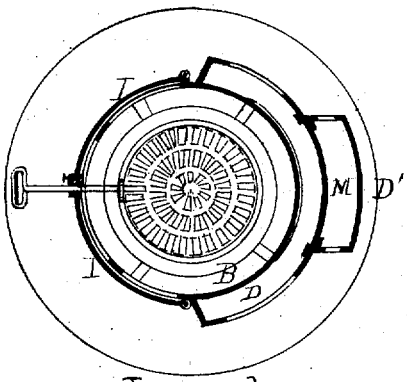

Figure 1 is a perspective view of my stove. Fig. 2 is a vertical section from side to side of my stove. Fig. 3 is a similar section from front to rear. Fig. 4 is a horizontal section on the plane *y y*. Fig. 5 is a similar section at *x x*.

In the drawing, A represents a base-plate, on which is erected a circular fire-pot section, B, the lower part of which forms an ash-pit, to which access is had through large doors C, each furnished with a draft-register, *a*. D is a combustion-chamber, which surrounds the rear half of the fire-pot section, and is made with a prolongation, D′, to the rear. E is a flanged division-plate, which rests on the top of the fire-pot section for about two-thirds of its circumference, and is made with an extension, E′, to the rear, which covers the sides of the combustion-chamber, but not the rearward extension thereof. F is the fire-pot, having a flange at the top, which rests upon an inner ledge at the top of the section B, in which it is suspended. The lower edge of the fire-pot is slotted or fingered, as at *b*, except at the back part. G is the grate, whose center stud is pivoted in a transverse bar, *c*, extending diametrically across the lower side of a ring, G′, supported by braces *d*, springing from the walls of the ash-pit on a plane with the grate, the latter and its ring being below the bottom of the fire-pot, leaving a space between, through which to introduce a poker to rake off clinkers and ashes. The grate is of less diameter than the fire-pot, and, while it has a rotary motion in a horizontal plane, its supporting-bar may be journaled so as to allow the grate to be tilted to dump its load. *e* is a flaring flange or dust-ring below the grate, to deflect the refuse falling from it into the ash-pan H beneath. *f* is a slot in the section B, closed by a slide, through which to introduce a rod to shake the grate, or a poker to rake off the clinkers. I I are two large doors, hung in an opening in the front half of the section B, at the plane of the fingered part of the fire-pot, which doors, when opened, convert the stove into a Franklin grate or open stove. The doors are glazed with sheets of mica, which allow the condition of the fire to be observed when the doors are closed, and also to illuminate the apartment in which the stove is placed. J is a conical magazine, whose base rests upon and is secured to the top of the fire-pot, forming a continuous reservoir from the top of the magazine to the grate. Its top, J′, flares outwardly, and is provided with a row of apertures, *g*. The magazine is inclosed in a cylindrical casing, K, surmounted by an enlarged cap-chamber, L, provided with a swinging or hinged cover, $L^1$, over the mouth of the magazine, into which projects a flaring pendent ring or deflector, $L^2$. The cover has a row of small apertures, *h*, and the cap-chamber one or more rows of apertures, I, to permit an inflow of small jets of air into the magazine and its casing, which is made in two parts, separated by a flange-ring, *j*, the lower part, except at the back, being of an open pattern, to allow the heated air-currents to escape. The flanged ring *j* extends from the casing to the magazine-walls around the front, two-thirds thereof, to two vertical flue-strips, *k*, extending down to the division-plate E, thereby making a segmental chamber about the lower front part of the magazine, through which air circulates and is warmed, while it also keeps down the temperature of that part of the magazine.

Between the flue-strips *k k* a throat, *l*, is made by cutting away the lower edge of the magazine, the wall of which, just above said throat, is inclined toward the front of the stove. The flames and gases of combustion pass out of the fire-pot through this throat, under the raised covering-plate $D^2$ of the combustion-chamber, impinging against a hanging bridge-wall or diaphragm, M, of refractory material, such as fire-brick, which extends nearly to the bottom of said chamber. Passing under said diaphragm, the heated currents rise behind it and find an exit through the collar *n*, at the back part of the covering-plate, into the smoke-pipe *m*. The front, back, and side walls of the combustion-chamber are lined with fire-brick or other refractory material, to resist the intense heat to which they are subjected.

By the draft created in the combustion-chamber, air will be drawn into the magazine-casing through the holes in the cap-chamber, where it is heated by passing down in contact with the magazine. The volume of heated air passes down between the flue-strips *k k* into the combustion-chamber, mingling with the gases of the combustion as they issue from the throat *l*, thereby supplying the oxygen to said gases necessary to insure their ignition and perfect combustion, which occur on the front side of the pendent diaphragm. The gases evolved from the coal that is partially coked in the lower part of the magazine collect in the top, whence they are drawn out by the draft through the apertures *g* into the magazine-casing, a constant circulation in the top being kept up by influent currents of air through the openings *h*, to insure the removal of those gases which are drawn down with the air-currents into the combustion-chamber and consumed. A slot is cut in the angle of the casing with the raised covering-plate $D^2$, which is closed by an angle-iron slide, *o*, which may be drawn back to admit a poker to clear the throat, in case it should become clogged with coal, or when an additional volume of air is required to insure combustion of the gases, beyond the amount or volume flowing down inside the magazine-casing.

The dust and ashes are deposited in the bottom of the combustion-chamber, whence they are withdrawn through a dust-door, *p*, at the back, little or none being carried up the smoke-pipe, owing to the perfection of the combustion on the front side of the bridge-wall. The door *p* is also provided with a register, which may be opened when it is desired to regulate or check the draft.

The sides of the combustion-chamber have large openings cut in them, which are glazed with mica, through which the clear white flames within—denoting perfect combustion—can at all times be observed when the stove is in operation.

*q* is an opening in the front part of the magazine, near the bottom, closed by a flap or pivoted cover, which may be opened for the introduction of a poker to break up any coal that may bridge and lodge at that point, which will sometimes occur in the use of coals that are rich with bitumen, which coals are apt to melt and run together in coking.

What I claim as my invention, and desire to secure by Letters Patent, is—

1. The combination, with a magazine-stove, of a combustion-chamber located at the plane of the fire-pot and ash-pot, and outside thereof, the said combustion-chamber being provided with a pendent diaphragm and a means for delivering air thereto in front of said diaphragm, substantially as described.

2. The illuminated combustion-chamber D $D^1$ $D^2$, and pendent diaphragm M, in combination with a magazine-stove having a throat to pass the gaseous products of combustion into said combustion-chamber, and a flue between the magazine and its casing for delivering air to the gases of combustion as they enter the said chamber, substantially as described.

3. The flanged division-plate *j* and flue-strips *k k*, in combination with the magazine J J′, casing K, and perforated cap-chamber L, for supplying a current of heated air to the combustion-chamber D, substantially as set forth.

4. In a magazine-stove, a pendent magazine, flaring at its lower end, in combination with a fire-pot flaring at its top, so that the lower end of the former is of the same size as the top of the latter, and the two flaring ends connected together in the whole circumference, except at the outlet-opening, for the escape of the products of combustion, and with the flue *l* and the supplementary combustion-chamber, substantially as described.

GEORGE W. HERRICK.

Witnesses:
IRA ANDREWS,
JAMES DWYER.